United States Patent Office 3,478,438
Patented Nov. 18, 1969

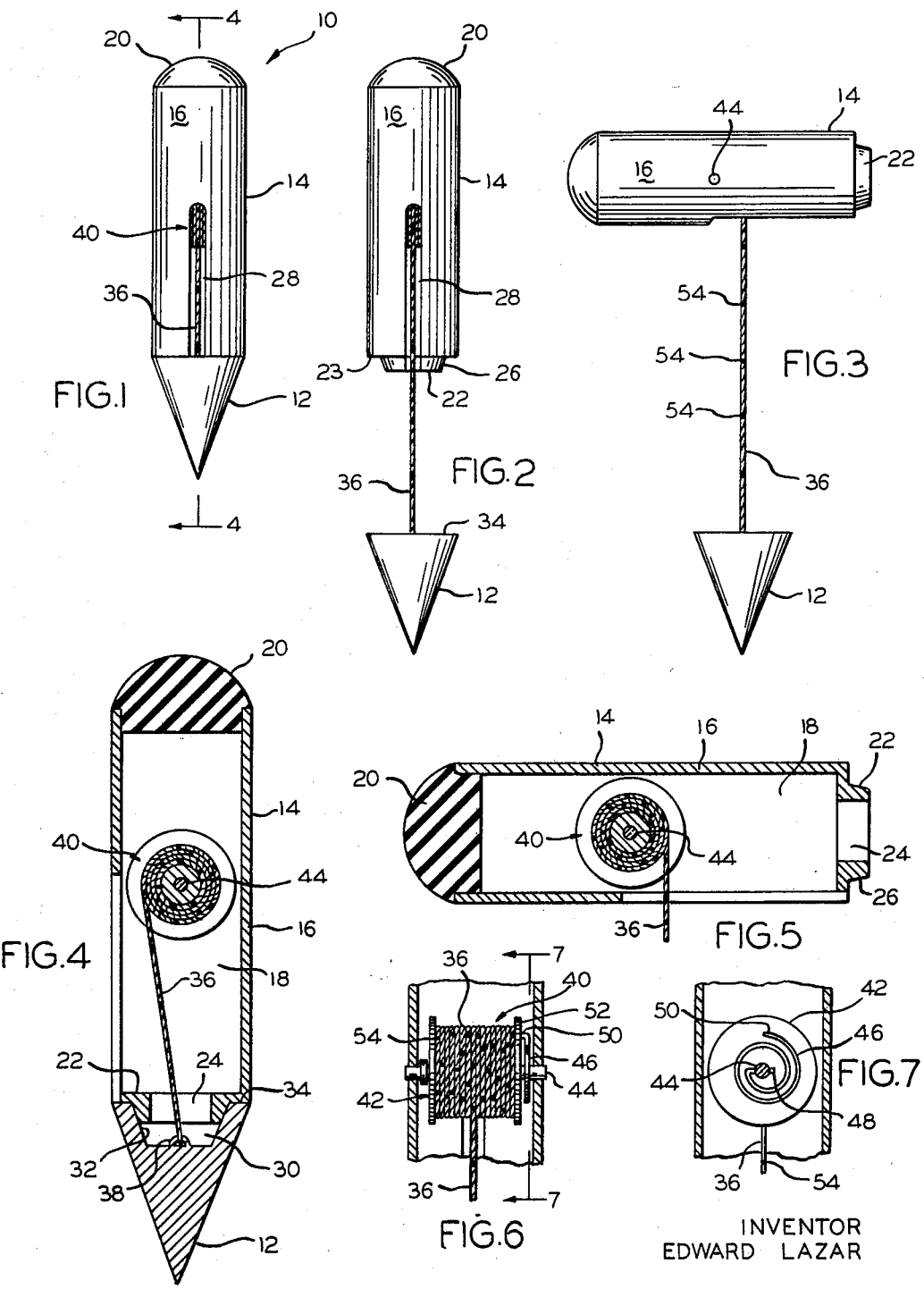

3,478,438
POCKET TYPE RETRACTABLE PLUMB-BOB AND CASING
Edward Lazar, 7623 Kildare Ave., Skokie, Ill. 60076
Filed Nov. 20, 1967, Ser. No. 684,197
Int. Cl. G01c 15/10, 9/00
U.S. Cl. 33—217  3 Claims

ABSTRACT OF THE DISCLOSURE

A two-part casing of which one part comprises a plumb-bob has a line retraction means in the other part; a slot in the wall of the second part of the casing opening to the end thereof enables the bob to be used with the casing held in various positions and also insures a tight press-fit between the two parts of the casing.

BACKGROUND OF THE INVENTION

This invention relates generally to improvements in plumb-bobs and more particularly to a housing comprising two parts one of which comprises the plumb-bob which is press-fitted into the second part containing line retraction means, thereby forming a compact self-contained unit.

Heretofore, plumb-bobs were used by mechanics, surveyors and artisans in construction work and the like for use in determining straight vertical lines. Typically such artisans carried their plumb-bobs unprotected in tool chests or the like. This in turn was inconvenient and burdensome for when it was desired to use the plumb-bob it was difficult to locate from among a morass of tools. Moreover, not infrequently the line became entangled or cut while stored in the chest.

For the foregoing reasons and with the advent of the "do it yourself" householder, the need for an encased protected or pocket type plumb-bob became self-evident.

Heretofore, most plumb-bobs did not have casings or housings and those which did were burdensome, difficult to use, and in fact were incapable of being used in locations where relatively cramped space could not accommodate the larger dimensions of the casing. In such locations the casing could only be held in one position in order to insure free fall of the line. By providing a two-part casing, one part of which is the plumb-bob and the other part containing the line retraction means having formed in the wall thereof a longitudinal slit, the line can project through the longitudinal slit to permit the plumb-bob to hang in free falling condition regardless of whether the casing is held vertically, horizontally or in any position between the two. Thus the structure of the present invention joins the plumb-bob and the casing together in compact, readily transportable, fully protected relationship and with the cord connecting the two parts stored in non-entangling and protected condition. Moreover, since the plumb-bob comprises a part of the housing itself, the size of the unit and the space which it occupies is kept to a minimum.

SUMMARY OF THE INVENTION

To overcome the problems heretofore prevalent in plumb-bobs, this invention provides a combination casing and plumb-bob which allows the plumb-bob to be quickly and conveniently used and then stored in a convenient self-encased manner.

It is also an important object of this invention to provide a retractable encased plumb-bob which may be used with the casing held in either horizontal, vertical or angular position.

It is a further object of this invention to afford a plumb-bob as part of a self-contained casing which together form a complete and compact unit which may be conveniently stored and transported.

It is still another object of this invention to provide a retractable plumb-bob line mechanism so that the plumb-bob line may be compactly stored and the plumb-bob itself locked to the body of the casing.

It is still a further object of this invention to provide a combination plumb-bob and casing in which the bob and the second portion of the casing are removably connected. This permits the entire device to be carried as a unit but enables the bob to be drawn quickly into operational position.

It is another object of this invention to provide a combination casing and plumb-bob in which the reel of the line retracting means is journalled within the housing so that the bob may be easily and readily moved into operational position.

Further objects are the provision of the combination two-piece plumb-bob and casing which is economical to make, fool-proof in operation, compact and easy to use in a variety of circumstances.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

BRIEF DESCRIPTION OF THE DRAWINGS

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a front elevational view of the preferred embodiment of the invention showing the same in storage condition;

FIG. 2 is a similar view but with the plumb-bob portion of the casing disengaged from the upper part in operational position;

FIG. 3 is a side view with the upper portion of the casing in horizontal rather than vertical position;

FIG. 4 is an enlarged sectional view taken on the plane of lines 4—4 in FIG. 1 of the drawings and viewed in the direction indicated;

FIG. 5 is a sectional view of the upper portion casing member but showing the same in the horizontal position;

FIG. 6 is a fragmentary view showing the detail of the retraction means; and

FIG. 7 is a fragmentary sectional view taken on the plane of lines 7—7 in FIG. 6 of the drawings and viewed in the direction indicated.

DESCRIPTION OF THE PREFERRED EMBODIMENT

Reference numeral 10 indicates generally a two-piece plumb-bob casing embodying the principles of my invention. The lower portion of the casing comprises a weighted plumb-bob 12 of conventional conical shape which is press-fitted into an upper casing portion 14 as shown in FIG. 1 of the drawings. The casing member 14 comprises a tubular or cylindrical wall member 16 defining an inner longitudinal bore or space 18 and may be closed at the upper or outer end by a rubber button 20 fitted into the outer end of the cylinder as shown in FIGS. 4 and 5 of the drawings. The lower end of the casing member 14 is formed with a reduced diameter portion 22 affording a shoulder 23 and having a central aperture 24 formed therethrough. Reduced diameter portion 22 may be formed with its outer wall 26 tapered as shown in FIGS. 2, 4 and 5 of the drawings. Thus the reduced diameter portion 22 comprises a neck depending below the shoulder 23. The function of this construction will become apparent as the description proceeds.

The wall 16 and the neck 22 of the housing member 14 is formed with a central longitudinal slot 28 opening to the outer end of the neck as shown in FIG. 2 of the drawings. The purpose of this slot likewise will become apparent as the description proceeds.

The plumb-bob 12 may be formed with a central depression 30 opening to the top of the bob and defined by an inclined wall 32 the angle of inclination of which is complementary to the wall 26 of the neck 22. Thus as shown in FIG. 4 of the drawings, the plumb-bob member 12 may be press-fitted onto the neck 22 thereby forming a compact, fully encased device in which the plumb-bob comprises the second part of the two-part casing.

To insure a tight-fitting but readily removable relationship between the plumb-bob part 12 and the upper casing portion 14 the depression 30 is sized so that it is slightly smaller than the neck 22. Therefore, in order to insert the neck 22 within the depression 30 the lower end of the upper casing member 14 is squeezed or compressed sufficiently to permit the neck 22 to enter the depression 30. The slot 28 affords the means which permits this action and once the neck has been inserted into the depression with the top wall 34 of the plumb-bob abutting the shoulder 23 of the upper casing member, the grip on the member is released permitting the same to return to its normal position with the neck wall 26 frictionally engaged by the depression wall 32 as shown in FIG. 4 of the drawings.

The plumb-bob member 12 and the upper casing member 14 are connected by the plumb-bob line 36 one end of which is attached to the plumb-bob by means of a loop or eye member 38 formed in the bottom of the depression 30 as shown in FIG. 4 of the drawings and the other end of which is attached to a retraction means indicated generally by reference numeral 40. The retraction means is positioned within the bore 18 of the upper housing segment 14 and comprises a reel or spool 42 mounted on a pin 44 the ends of which are rotatably journalled through aligned openings formed in the wall 16 of the upper casing member 14.

To make the retraction means 40 automatic or self-winding a coil spring 46 is associated with the reel 42 with its inner end 48 affixed through the pin 44 and its outer end 50 inserted through the adjacent wall 52 of the reel 42.

To enable the device to be used for an additional function such as a measuring or tape line, the line 18 may have imprinted thereon or formed therein at regular predetermined intervals indicia or markings 54. Such indicia may represent inch or fractional inch intervals.

In operation, normally the plumb-bob is used with the upper casing member 14 held in the vertical position as shown in FIG. 2 of the drawings. However, in some locations or if desired the plumb-bob may be used with the casing member 14 held in the horizontal position as shown in FIGS. 3 and 5 of the drawings. In this position it will be noted that the line 36 extends through the slot 28 in unobstructed free falling position.

The rubber button or cap 20 in addition to affording shock absorbing protection also insures frictional contact if it is desired to steady the plumb-bob by holding the upper casing member 14 against a wall or similar object.

From the foregoing, it should be apparent that I have provided a plumb-bob and casing which is compact, sturdy, durable and easy to use while economical to manufacture. It is easily transportable while occupying a minimum of space and may be used in a variety of positions.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention.

What I claim and desire to secure by Letters Patent of the United States is:

1. A compact plumb-bob and casing therefor comprising: an open ended casing member; a lower combination plumb-bob and casing member; a plumb-bob line connecting said members; line retracting means positioned in one of said members and associated with said plumb-bob line, said upper casing member having means closing one end thereof and a reduced diameter portion at the other end defined by a shoulder and a neck having an inclined wall; said lower member formed with a central depression opening to the top thereof and defined by an inclined wall complementary to the wall of said neck; whereby the neck and depression cooperate to afford a friction-fit; said upper casing member and reduced diameter portion being formed with a slot opening to the outer end of said neck, said slot accommodating said plumb-bob line in free falling relationship and said slot affording means permitting said upper casing member to be compressed sufficiently for the neck to be seated in said depression and then released to insure said friction-fit; and means at the other end designed to cooperate with said lower combination plumb-bob and casing member to join said members together in friction-fitting readily-separable relationship, thereby closing the other end of said casing member.

2. The plumb-bob and casing member of claim 1 wherein said retractable line means is positioned within said upper casing member by a pin journaled through the wall of said casing and comprises:
   a reel upon which said plumb-bob line is wound; and
   a coil spring associated with the reel with its inner end affixed to said pin and its outer end affixed to said reel.

3. The plumb-bob and casing of claim 1 in which the means for closing one end of the upper casing member comprises a rubber cap removably fitted therein and affording friction means for supporting one end of said plumb-bob and casing in a horizontal plane against a vertical surface.

References Cited

UNITED STATES PATENTS

| | | | |
|---|---|---|---|
| 880,387 | 2/1908 | Morrill | 33—217 |
| 2,480,490 | 8/1949 | Mark | 33—126.5 |
| 3,011,263 | 12/1961 | Unger | 33—217 |
| 3,284,914 | 11/1966 | Kruse | 33—217 |

LEONARD FORMAN, Primary Examiner

DENNIS A. DEARING, Assistant Examiner

U.S. Cl. X.R.

33—207